March 31, 1970 G. DAVIDESCU 3,503,224
DRILL STRING VIBRATION DAMPER
Filed July 11, 1968

Grigore Davidescu
INVENTOR.

BY
Karl F. Ross
Attorney

United States Patent Office 3,503,224
Patented Mar. 31, 1970

3,503,224
DRILL STRING VIBRATION DAMPER
Grigore Davidescu, Str. Olteni 68, Bucharest, Rumania
Filed July 11, 1968, Ser. No. 744,232
Int. Cl. F16d *3/17*
U.S. Cl. 64—11                                         10 Claims

ABSTRACT OF THE DISCLOSURE

A vibration-damping system for a drill string wherein at least one pipe length therealong is provided with a stack of tubular springs having outer metallic shells bearing upon one another and bonded to a rubber sleeve and inner metallic shells bonded to the rubber sleeve and bearing axially upon one another. The string length includes a tubular core extending through the cylindrical cushion sleeves and bearing against the axially aligned inner sleeves while being anchored to the outer shell of the length.

---

My present invention relates to a vibration and oscillation damping system for a drill string and, more particularly, to a drill-string length provided with a vibration damper.

It has already been proposed to provide drill strings which generally consist of tubular lengths of pipe interconnected by mating male and female fittings at their ends and carrying, at the foot of the drill string, a rotary bit with vibration damping means for cushioning the axial and tortional vibration and shock to which the string is subject. Generally, such means consist of a mass of rubber or other elastomeric material bonded between the inner surface of an outer tubular body and the outer surface of a coaxial inner tubular body, these bodies making up the pipe length. Such systems have the disadvantage that bonding of rubber sleeves over extensive portions of the length of these bodies is difficult and expensive and frequently is unreliable. Thus the problem of arising from axial and tortional vibration in a drill string has not adequately been solved by prior art techniques. The problem is complicated by the fact that the shock-damping cushion must be capable of transmitting axial force and torque from one length of the drill string to another length (or the bit) while the tubular configuration cannot be avoided because of the need to supply drilling mud to the bit.

It is, therefore, the principal object of the present invention to provide an improved vibration-damping system for a drill string of the character described. Another object of my invention is to provide, in a drill-string length, a vibration damper which will allow torsional and axial force to be transmitted through the string body yet enable damping of such shocks when force transmission is not required. Still another object of this invention is to provide a vibration damper for the purpose described which can be made more simply and less expensively than earlier systems and which can be accommodated to the particular requirements with respect to the magnitude of stress to which the system is subject.

These objects can be attained, in accorddance with the present invention, through the substitution of a stack of sleeve-type spring devices for the mass of elastomeric material previously required and by the use of two distinct spring assemblies for axial stock and vibration and for torsional shock and vibration, respectively.

According to a specific feature of this invention, the axial vibration-damping means includes the aforementioned stack of cylindrical spring elements while a mass of elastomeric material bonded to inner and outer bodies of the particular length of the drill string forms the torsional spring; between these two bodies, however, there is provided a lost-motion connection formed by angularly equispaced interfitting formation on these bodies receiving one another with clearance within the elastic limit of the torsion mass but adapted to engage angularly for direct force transmission when the torsional stress tends to exceed this elastic limit, thereby preventing tearing of the torsion element. Similarly, axial abutment means is provided between the inner and outer bodies which act in opposite directions upon the stack of cylindrical axial springs so that direct force transmission is possible upon a failure of the elastomeric mass of one or more of these springs or when the axial elastic limit is about to be exceeded.

According to a more specific feature of this invention, the vibration damper comprises an outer member or casing formed at one end with a pipe fitting allowing the vibration-damping pipe length to be affixed to the lower end, for example, of the next upper pipe length. The casing or outer member coaxially receives a tubular inner body whose end remote from the first-mentioned fitting is provided with a mating fitting to enable successively lower pipe lengths to be joined thereto, the inner and outer members being relatively displaceable axially and angularly. At axially spaced locations surrounding the inner body and in the annular clearance between the inner body and the outer body, the outed body is formed with an annular outer shoulder while the inner body is formed with an annular inner shoulder bearing axially upon a stack of outer sleeves and a stack of inner sleeves of the stacked cylindrical springs. Each of these springs comprises a metallic outer sleeve and a metallic inner sleeve bonded (e.g. by vulcanization) to a rubber mass substantially filling the space between these sleeves. When the cylindrical springs are inserted in the aforementioned annular clearance, their inner sleeves are axially aligned and are urged in one axial direction while the aligned outer sleeves are urged in the opposite axial direction upon the development of axial stress.

A vibration-damping system of this character has the advantage that it allows an optimum absorption of axial and torsional shock, it precludes distortion of the elastomeric damping material, it permits the damping bodies to be replaced on the drilling site, and it offers savings in construction and assembly costs.

The above and other objects, features and advantages of the present invention, will become more readily apparent from the following description, reference being made to the accompanying drawing in which.

Figures 1A, 1B:
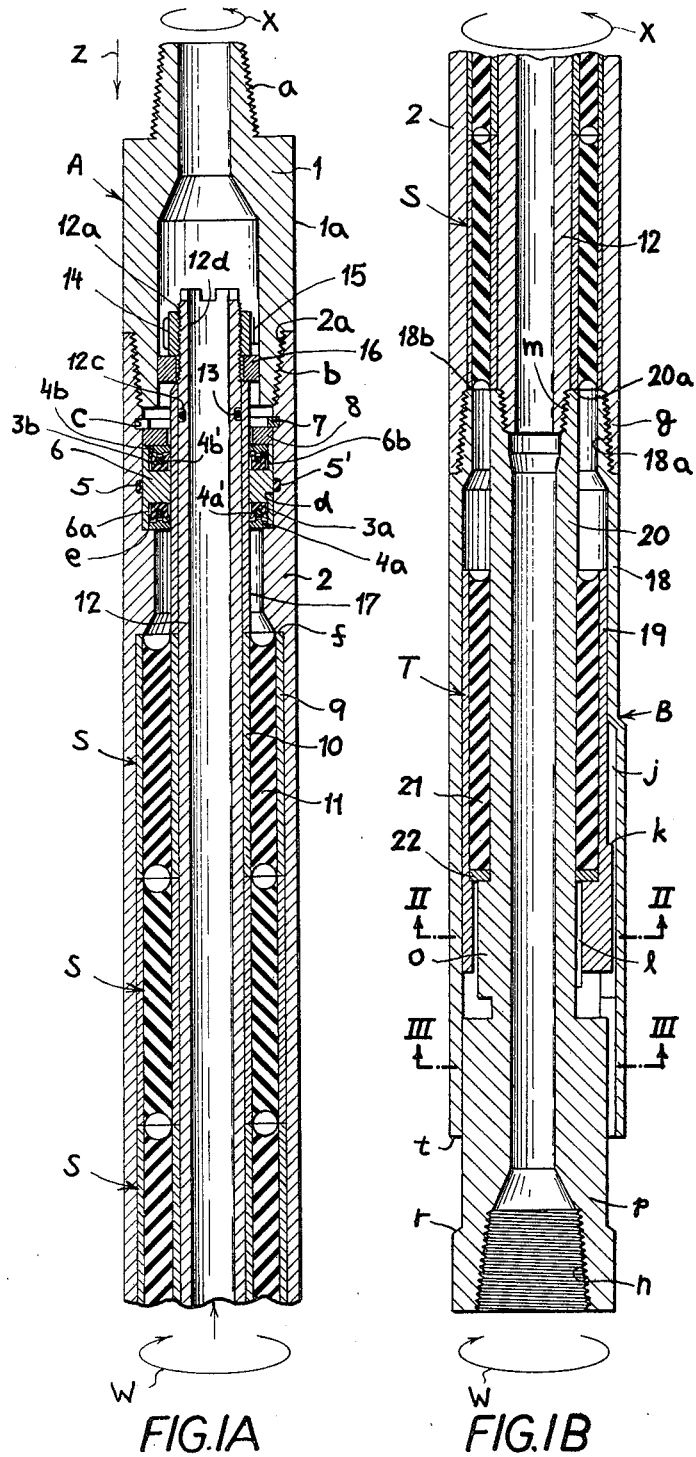
FIG. 1A is a longitudinal cross-sectional view through the upper portion of a drill string length provided with a damper of the present invention.
FIG. 1B is a longitudinal section through the lower portion thereof.

In the drawing, I show a drill-string length having an upper assembly or drill-string portion A forming a damping device for axial shock and a lower assembly or drill-string portion B constituting the damping device for torsional shock and vibration, the assemblies being threadedly interconnected as will become apparent hereinafter.

The upper assembly A comprises a tubular connecting piece having an upwardly extending threaded male pennon *a* for threaded connection to the female socket (e.g. *n*) of the next uppermost drill string length; at its lower end, the cylindrical connecting piece 1 is formed with a downwardly extending male pennon *b* threaded into the female portion or socket 2*a* of a cylindrical tubular casing 2 which is flush with the body 1a of connecting member 1. The sleeve or casing 2 is provided with a groove c forming a seat for a spring ring 7 which, in turn, forms one flank of a larger axially extending circumference channel d forming a seat for a spacing ring 6. At its lower end, the seat d, an upwardly facing shoulder e is formed while below this channel a downwardly facing shoulder f is provided. At its lower end, the casing 2 is provided with a female thread g which receives the male thread 18a of a further casing axially aligned and flush with the casing 2.

At the upper end of the casing 2, I provide a tightening device and seal, which in part functions as an axial vibration-absorbing damper, this tightening device comprising a pair of axially open flange-type rubber sealing rings or sleeves 3a and 3b facing downwardly and upwardly respectively. The inner flanges of these rings engage spacer sleeve 17 which, in turn, is sealingly held upon a tubular core 12 through a center bore 12d of which the drilling mud is pumped. A pair of clamping rings 4a and 4b, respectively slidable in axial annular channels 6a and 6b in the spacer sleeve 6, holding the seals 3a and 3b apart, are formed with webs 4a' and 4b', respectively, which drive the flanges of the seals outwardly when axial pressure is applied to the device. A sealing ring 5, received in a groove 5' in the wall of casing 2, bears against the sleeve 6. A retaining ring 8 is interposed between ring 4b and spacer sleeve 6 and the shoulder e to hold the sealing assembly in place.

Below this seal I have provided the axial damping means of this invention. The axial spring means of the upper section A (represented at the lower part of FIG. 1A and the upper part of FIG. 1B) comprises a stack of axially aligned identical tubular rubber springs of which four are shown in this embodiment. As was noted previously, these springs operate on the shear principle, to damp axial vibrations generated between inner and outer metallic members which are affixed together or bridged by a mass of elastomeric material vulcanized or otherwise bonded to the inner and outer members and preferably filling the space between them.

In this system, each of the tubular springs S comprises a metallic outer sleeve 9, a coaxial metallic inner sleeve 10 (axially coextensive with the outer sleeve 9 and spaced inwardly therefrom with all-around clearance) and a mass 11 of elastomeric material filling the space between the members 9 and 10 and bonded to both of them. Natural or synthetic rubber may be used as the elastomeric mass.

From FIGS. 1A and 1B, it will be apparent that the outer sleeves 9 of the stack of springs S bear against one another and are seated at the upper end of the stack of the shoulder f while, at the lower end of the stack, they are held in place by a shoulder 18b formed when the threaded male member 18a is received in the socket g. The inner sleeves 10, however, are also in axial alignment and force-transmitting relationship with one another and, at the upper end of the stack, with the spacer sleeve 17 which, in turn, abuts a ring 16 surrounding the tubular core 12. The latter is axially shiftable relative to the casings 18 and 2 within the seal assembly 3a through 8 and is provided at its upper end with a thread 12a and a four-notch socket for a retaining key. A nut 14 is threaded onto the end 12a of the core 12 while a key retains the latter at the socket 12b to anchor the abutment ring 16 in place. A pin 15 may lock the nut 14 against self-loosening. The internal sleeves 10 of the springs S closely hook the core 12 and are clamped against one another and the ring 16 by the shoulder 20a formed when the lower threaded portion m of member 12 is threaded into the tubular member 20 as described below.

Figure 2:
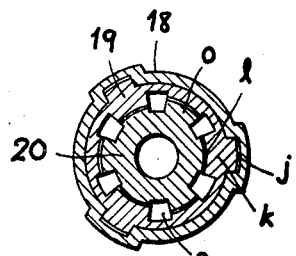
FIG. 2 is a cross-section along the lines II—II of FIG. 1A.
Figure 3:
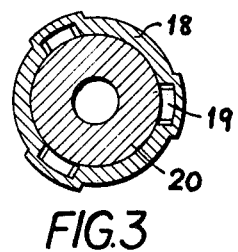
FIG. 3 is a cross-section along the line III—III of FIG. 1B.
Figure 4:
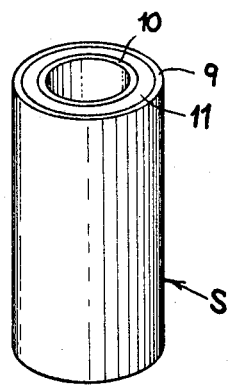
FIG. 4 is a perspective view of one of the tubular axial springs of the present invention.

The lower assembly B, which is designed to absorb torsion shock, comprises the outer sleeve 18 (mentioned earlier) which is threaded at 18a into the socket g of casing 2 so as to be substantially flush therewith at least along the exterior of the drill string length. At its lower end, the casing 18 is formed with longitudinal channels j into which the lateral longitudinal ribs k (FIG. 2) of a shear bushing 19 extend slidably. These ribs have an axial length (FIG. 1B) which is less than the axial length of the grooves so that the end t of the casing 18 may bottom upon the shoulder r. This allows relative axial movement of the torsional spring T and the casing 18 while coupling the casing and the torsional spring angularly.

Internally, the bushing 19 is formed with three angularly spaced jaws l which surround the member 20 whose jaws o are interleaved with jaws l without contacting same. The jaws o have an axial length (FIG. 1B) exceeding the axial length of the jaws l. The lower portion of member 20 is represented at p and is guided in the sleeve 18 which it can engage at r, t.

Between the bushing 19 and the tubular member 20, the torsion bearing T is formed with a rubber mass or a mass of another elastic material (represented at 21) bonded by vulcanization or otherwise to the confronting surfaces of the bushing 19 and the tube 20. A ring 22 is disposed between the rubber mass 21 and the jaws o, l, to prevent the rubber from extruding into the free spaces s between the jaws o and l during vulcanization.

In use, the pennon a is threaded into the drill string while the bit is threaded into the socket n or is connected thereto by another length of drill string. The seals 3a–8 allow the drilling mud to pass from the connecting piece 1 into the tube 12 and thence through the tube 20 to the bit without interference with the damping action.

During drilling, axial pressure is applied to the drill bit in the direction of arrow Z (FIG. 1A) while the rotation force is applied in the direction of arrow X. Downward pressure is applied via the connecting piece 1 to the casing or sleeve 2 and thence to the stacked outer sleeves 9 of the spring S. From these outer sleeves 9, the downward pressure is delivered by the rubber masses 11 to the inner sleeves 10 which, in turn, transfer the downward force at the shoulder 20a to the tube 20 and the bit. Axial vibration and stress occur in the direction of arrows Y and Z and are dissipated by shear at the elastomeric masses 11. It will be evident, therefore, that the stiffness of the damping device can be less when the load is less and that fewer springs S may be used for their purpose. When the load increases, the number of axial tubular springs can be increased. When fewer springs are used, the stack may be completed by an inner sleeve 10 and an outer sleeve 9, not connected by any rubber mass. If one or more of the rubber bodies 11 cannot withstand the axial force, drilling can nevertheless continue since the end t of the casing 2 engages the shoulder r and descending axial pressure remains effective.

Retraction of the bit is possible even if the elastomeric masses 11 are destroyed since, on the upstroke of the members 1 and 2, the device allows the ring 8 to engage the ring 16 and thereby draw the core 12, 20 upwardly. Transmission of torsional moment from the drill string to the bit is effective at the assembly B when torque (arrow X) is applied to the connecting piece 1 in, for example, the counterclockwise direction represented by the arrow X. This torque is transmitted to the casing 18 via the casing 2 and is applied to the ribs k of the bushing 19. The rubber mass 21 of the torsion spring T entrains the tube 20 in the same sense while vibration and shock can be represented by the interplay of the torques W and X. If the antagonistic couple exceeds the torque able to be transmitted by the mass 21, the bushing 19 and the member 20 eventually engage at the jaws o and l to permit direct force transfer without destroying the rubber mass.

The improvement described and illustrated is believed to admit of many modifications within the ability of persons skilled in the art, all such modifications being considered within the spirit and scope of the invention.

I claim:
1. A drill string damping system comprising:
    a drill-string length having two axially aligned interconnected drill-string portions with respective inner and outer members in force-transmitting relationship with one another;
    axially effective spring means between the inner and outer members of one of said portions;
    torsionally effective spring means between the inner and outer members of the other of said portions; and
    means for connecting the inner member of one portion and the outer member of the other portion to other elements of the drill string.
2. The system defined in claim 1 wherein said axially effective spring means comprises a stack of similar spring bodies surrounding the inner member of said one of said portions, said bodies having inner and outer parts bridged by respective elastomeric masses, said inner member of one of the portions and said outer member of the other of said portions being provided with axially spaced abutments respectively engageable with inner and outer parts at the opposite ends of said stack.
3. The system defined in claim 2 wherein said parts of each of said bodies include an inner sleeve and an outer sleeve axially coextensive with one another and bonded to a mass of elastomeric material substantially filling the space between said sleeves.
4. The system defined in claim 2 wherein said torsionally effective spring means includes a bushing coaxially surrounding said inner member of said other portion and an elastomeric mass bonded to said bushing and said inner member of said other portion.
5. The system defined in claim 4 wherein said bushing and the outer member of said other portion are provided with interfitting formations affording relative axial displacement of said outer member of said other portion and said bushing but angularly interconnecting same.
6. The system defined in claim 5 wherein said inner and outer members of said other portions are formed with stop means preventing relatively axial displacement of said inner and outer members beyond a predetermined stroke.
7. The system defined in claim 6 wherein said bushing and said inner member are provided with interfitting formations affording direct angular engagement of said bushing and said inner member of said other portion upon relative angular displacement thereof beyond a predetermined stroke.
8. The system defined in claim 7 wherein said inner members are axially aligned and threadedly interconnected.
9. The system defined in claim 8 wherein said outer members are axially aligned and threadedly interconnected.
10. The system defined in claim 9, further comprising sealing means interposed between said inner and outer members for preventing leakage therebetween.

References Cited

UNITED STATES PATENTS

| | | | |
|---|---|---|---|
| 2,212,153 | 8/1940 | Eaton et al. | |
| 2,325,132 | 7/1943 | Haushalter et al. | 64—11 XR |
| 3,033,011 | 5/1962 | Garrett | 64—23 X |
| 3,383,126 | 5/1968 | Salvatori et al. | 64—23 X |

JAMES A. WONG, Primary Examiner